US006363360B1

(12) United States Patent
Madden

(10) Patent No.: US 6,363,360 B1
(45) Date of Patent: Mar. 26, 2002

(54) SYSTEM AND METHOD FOR ANALYZING AND ORIGINATING A CONTRACTUAL OPTION ARRANGEMENT FOR A BANK DEPOSITS LIABILITIES BASE

(76) Inventor: Martin P. Madden, 3814 N. Alta Vista, Chicago, IL (US) 60613

( * ) Notice: Subject to any disclaimer, the term of this patent is extended or adjusted under 35 U.S.C. 154(b) by 0 days.

(21) Appl. No.: 09/406,214

(22) Filed: Sep. 27, 1999

(51) Int. Cl.$^7$ .............................................. G06F 17/60
(52) U.S. Cl. ...................................................... 705/37
(58) Field of Search .............................. 705/37, 36, 26; 345/237

(56) References Cited

U.S. PATENT DOCUMENTS

| | | | | |
|---|---|---|---|---|
| 5,202,827 A | * | 4/1993 | Sober ........................... | 705/36 |
| 5,557,157 A | | 9/1996 | Daugherty, III | |
| 5,671,363 A | | 9/1997 | Cristofich et al. | |
| 5,715,402 A | * | 2/1998 | Popolo ......................... | 705/37 |
| 5,787,402 A | | 7/1998 | Potter et al. | |
| 5,787,405 A | | 7/1998 | Gregory | |
| 5,802,499 A | * | 9/1998 | Sampson et al. ............. | 705/35 |
| 5,897,621 A | * | 4/1999 | Boesch et al. ................ | 705/26 |
| 5,897,625 A | | 4/1999 | Gustin et al. | |
| 5,970,479 A | * | 10/1999 | Shepherd ...................... | 705/37 |
| 6,058,379 A | * | 5/2000 | Odom et al. .................. | 705/37 |
| 6,061,661 A | * | 5/2000 | Hagan ........................... | 705/35 |
| 6,085,169 A | * | 7/2000 | Walker et al. ................. | 705/26 |

FOREIGN PATENT DOCUMENTS

| | | | | |
|---|---|---|---|---|
| WO | WO 01/24079 | * | 4/2001 | ........... G06F/17/60 |

OTHER PUBLICATIONS

India—Banking Goes On The Net At Global Trust—CT Mahabharat Newsbytes, Aug. 18, 1999.*
OptionsAnalysis .com Offers a Menu of Features and Applications Giving Traders Freedom to Focus on Strategies—Nov. 20, 1997 PR Newswire Association.*
American Banker–Mar 24, 1998–vol. 163 Issue 56 p. 18—Chicago Firm's Software Helps Lenders Design Risk–Hedging Strategy.*
Article by Peter Coy, *Exploiting Uncertainty*, in "Business Week" of Jun. 7, 1999, pp. 118–124.
Derivative and options definitions used by bank regulatory authorities, FFIEC (031, 032, 033, 034), pp. A26–A32 (Sep. 1997).

* cited by examiner

*Primary Examiner*—Vincent Millin
*Assistant Examiner*—Geoffrey Akers
(74) *Attorney, Agent, or Firm*—Niro, Scavone, Haller & Niro

(57) ABSTRACT

A system and method for analyzing and originating a contractual option arrangement for transacting a deposit liabilities base of a financial institution at predetermined prices and time periods.

8 Claims, No Drawings

SYSTEM AND METHOD FOR ANALYZING AND ORIGINATING A CONTRACTUAL OPTION ARRANGEMENT FOR A BANK DEPOSITS LIABILITIES BASE

BACKGROUND OF THE INVENTION

The present invention relates to a system and method for analyzing and originating a contractual option arrangement for selling bank deposits at a predetermined price.

Maintaining access to capital financing is a primary responsibility of bank management. Financial institutions that can best guarantee access to equity are often best positioned to weather industry cycles and take advantage of new opportunities that require capital investment. Unfortunately, the traditional method of attracting outside equity investment—selling common equity securities—is not suitable for contingency planning. There is normally little chance of reliably securing financing commitments in anticipation of a future unspecified need. Consequently, timing issues make raising equity only when it is needed an uncertain and costly process.

Associated with maintaining access to financing sources is management's role in effectively communicating the institution's true fundamental value to the investment community. Success in doing so relies in large part on the details of the institution's financial condition. Analyzing those details and valuing the different components of an institution's financial condition is a complex undertaking that often yields imprecise results. Nevertheless, a wide variety of market and regulatory participants have critical needs for such information. Long-standing procedures for quantifying values of different balance sheet components are continually employed by investors, accounting firms, bank regulators, and consultants in a variety of different manners.

In their simplest form, investors use these techniques to search for profit opportunities that are not immediately evident from a superficial reading of a bank's financial statements. Potential opportunities can be identified in the differences between historically determined, conservatively stated book values and estimated current market values. For instance, assets that were acquired previously (and valued when acquired) might now have substantially higher current values that are not recognized on financial statements.

Management and consultants use more complex valuation procedures to determine the costs and profitability of individual lines of business and individual customer relationships. Investors, management and regulators also apply estimating techniques for risk analysis purposes. For instance, by accurately accounting for the pricing and timing differences between assets and liabilities, observers can forecast an institution's exposure to fluctuations in the external interest rate environment.

Apart from analyzing ongoing businesses, valuation techniques are used in transaction-specific circumstances, such as to account for changes brought by merger and acquisition activity. These valuation techniques will now be briefly discussed.

Acquisition Accounting

Under Generally Accepted Accounting Principals (GAAP), mergers and acquisitions have traditionally been accounted for in one of two ways. Transactions in which sellers receive compensation only in the form of common stock of the buyer may currently be accounted for as "pooling-of-interest" transactions. Accounting for pooling transactions is simply a matter of aggregating the existing book values of the separate financial statements into a newly merged single set of statements.

Acquisitions in which sellers receive compensation, in part or in whole, other than in the form of the buyer's common shares are treated as "purchase accounting" transactions. Acquisitions structured as purchase transactions require that the selling company's financial statements be re-valued as of the transaction date (a practice often labeled "marking-to-market"). Unlike pooling of interest accounting, purchase accounting requires that the purchase premium over book value be allocated to different parts of the seller's balance sheet.

The philosophy behind this purchase accounting practice is to quantify the reasons why a buyer paid a particular purchase price. By re-valuing various balance sheet elements (primarily assets) as if they were to be liquidated at their current values, purchase accounting can accurately allocate portions of the purchase premium to specific assets. For instance, assume that Bank A buys Bank B for $20 million in cash. Assume further that, prior to closing, Bank B has been valued according to GAAP as follows:

| | |
|---|---|
| Total Assets | $100 million |
| Cash | $3 million |
| Investments | $30 million |
| Loans | $62 million |
| Premises | $1 million |
| Other | $4 million |
| Total Liabilities | $92 million |
| Checking | $15 million |
| Savings | $25 million |
| NOW | $10 million |
| Money Market | $10 million |
| Cert. of Deposit | $30 million |
| Other | $2 million |
| Total Equity | $8 million |
| Preferred | — |
| Common | $1 million |
| Paid-in | $1 million |
| Retained | $6 million |

On the sale date, the buyer's auditors will mark-to-market Bank B's balance sheet, and allocate the $12 million purchase premium ($20 million purchase price minus equity book value of $8 million) to the differences between market and book among the various assets. Normally the first step in the allocation process is to identify "tangible purchase adjustments", or differences between market and book value for assets with established (and therefore "tangible") market values. For instance, an appraisal of the seller's premises would be ordered. If Bank B's premises are relatively old, Bank B may have depreciated the initial cost of the property to a point well below its current market value. GAAP would require that Bank B's premises account be restated to reflect the difference. Therefore, a $1 million write-up in the value of Bank B's building would account for $1 million of the $12 million purchase premium.

Next, the bonds in Bank B's investment portfolio, which normally are all high quality, marketable securities, will be priced. Due to changes in rates and other factors, these investments individually may be worth more, or less, than their original purchase price. If, in the aggregate, they are worth more, under GAAP the accountants will restate Bank B's investments upward, reflecting the appreciation and simultaneously reducing the unallocated portion of the purchase premium.

Valuation methodology would then be applied to Bank B's loan portfolio. Obtaining accurate values for the bank's loan portfolio may be more difficult than ascertaining current market values of real estate or investments as outlined above. Individual loans cannot be as accurately priced as individual high-quality bonds. Instead, the loans are likely to be analyzed using portfolio estimating techniques to measure pricing, risk and random effects.

As can be seen, ambiguity in valuing balance sheet items renders purchase accounting an inexact process. Generally, tangible purchase accounting adjustments are limited to the assets with the most clearly justifiable estimated market values. Once these adjustments are made, any remaining unallocated portion of a purchase premium is assigned to intangible adjustments, such as goodwill, which are not as easily quantified.

Valuing Goodwill and Other Intangibles

Because values of intangible assets are less certain than those of tangible assets, regulators discount intangible assets when evaluating financial institutions for capital adequacy purposes. Specifically, the Federal Reserve Board (FRB) requires that the intangible portion of a purchase premium must be deducted from the acquiring bank holding company's proforma consolidated capital. From a regulatory perspective, intangible adjustments make it difficult for banks to engage in purchase accounting transactions versus pooling of interest transactions. Goodwill is an intangible asset category. It is used as a plug figure when all other adjustments have been made, but goodwill, as a concept, is technically no more than an attempt to quantify the impossible to accurately measure value found in established selling businesses due to factors like their reputations or brand identities. Yet these factors are often not why buyers pay large premiums for selling banks. Selling banks may have created some intangible market value attributable to such factors, but a greater value is often placed on their ability to borrow money cheaply.

Just as there is value in lending money at higher than market rates, there is value in borrowing money at lower than market rates. Financial institutions generate liability funding cost savings by attracting core deposits with their convenient access to the payment system and FDIC deposit insurance. This reality is partially incorporated in a less frequently applied purchase accounting adjustment—the core deposit intangible. This adjustment is, obviously, just as intangible as goodwill. Although it may be a more accurate representation of the rationale behind the purchase premium, it is deducted just the same from proforma regulatory capital. Buyers, therefore, frequently do not take the time to allocate their excess purchase premiums in this manner.

This intangible treatment rests on the determination that bank liability bases have values that are too ambiguous to measure for accounting purposes. While this may be the case for accounting purposes, it is likely not the case for investment purposes. Third party market participants, given the opportunity to obtain low cost deposit bases, normally pay more than book value for them. The Resolution Trust Corporation (RTC) helped defray the costs of the Savings & Loan crisis of the 1980's by auctioning the deposit bases of failed thrifts at a profit. Commercial bank deposit bases, some of which are spun-off every year by acquirers divesting for antitrust purposes, are often considered even more valuable due to the presence of a larger number of non-interest bearing demand deposits.

Quantitative analysis methods can be used to demonstrate the potential fair values of core deposits, but it is believed that modifying and extending them to incorporate the steps necessary to create a mechanism to contractually establish their actual market values has never been done.

The benefits of providing a contingency mechanism for buying and selling core deposit bases would be numerous. A new market in which third parties are contractually obligated to pay pre-established fixed prices for a certain dollar amount of deposits would be an additional method for bank holding companies to obtain advance commitments to raise tangible equity capital. Financial institutions could better justify their intrinsic values to the capital markets, thus facilitating better access to financing sources. Sellers could more reliably obtain market prices without burdening themselves with the credit and liquidity risks brought about in pooling transactions. Equity capital would be more efficiently employed without the potential dangers of enabling acquirers to speculate on unreliable future values with leveraged financing. Management, employees, regulators and other industry participants would be more clearly informed about the rationale behind merger and acquisition activity, as well as the fundamental value of financial institutions in general.

DEFINITION OF CLAIM TERMS

The following terms are used in the claims of the patent as filed and are intended to have their broadest meaning consistent with the requirements of law.

"Deposit liabilities base" means part or all of the deposit gathering function of a financial institution, including existing funds of individuals, partnerships, corporations and public entities on deposit, as well as the function's prospective capabilities (if any) to attract similar funds with benefits such as federal deposit insurance or convenient access to the payment system.

"Financial institution" means firms such as bank holding companies, and FDIC-insured commercial banks and thrifts engaged, to at least some degree, in interest margin-generating financial intermediation activities.

SUMMARY OF THE INVENTION

These and other objects are provided by the present invention, which preserves the advantages of known methods for valuing intangible assets of banks, while overcoming disadvantages associated with such methods, and also providing new advantages not previously realized which permit the creation of a market for such assets.

The present invention is a system and method for analyzing and originating a contract a deposit liability option contract wherein a third party (the "writer") agrees to offer a financial institution (the "purchaser") the right for a period of time to sell a fixed dollar amount of deposit liabilities to the writer at a predetermined price. The invention employs a computer system to generate output regarding the subject deposits, which is then incorporated in contractual documents that specify the price the writer will pay during a predetermined term for the subject deposits (along with a corresponding amount of eligible assets at fair market value), which may be dependent on the exercise of a "put" at the option of the purchaser.

In the practice of the invention, external market data, or estimates thereof, relating to deposit pricing practices, branch divestitures and other pertinent factors are input to the computer system. Internal data relating to the subject deposit base is also input to the computer system. One or more valuation analyses are performed on the subject deposit base, incorporating the external and/or internal data, to determine an estimated market value or range of such values. A minimum potential bid price, or range of such prices, is then generated and incorporated into the contract documents.

In one preferred embodiment of the invention, a method is employed for analyzing the value of a deposit liabilities base associated with a financial institution and for originating contractual documents through which the financial institution obtains the right to sell the deposit liabilities base to a third party at a predetermined price. External market data, and internal data pertaining to the financial institution, is analyzed and input to a computer system. An estimated market value or a range of such values is then calculated for the deposit liabilities base. Next, a minimum potential bid price or a range of such prices is generated for the deposit liabilities base. These generated prices are then incorporated into the contractual documents, which specify the price or range of prices which the third party will pay during a predetermined term for the deposit liabilities base.

In a preferred embodiment, the financial institution exercises its right as specified in the contractual documents to sell the deposit liabilities base to the third party. In an alternative embodiment, the external market data may include data relating to deposit pricing practices, and the internal data may relate to the deposit liabilities base of the selling financial institution.

In alternative preferred embodiments, the deposit liabilities base may include either or both of non-interest bearing and interest bearing deposit accounts. The method of the present invention may also incorporate one or more of its steps into a purchase accounting acquisition of a selling financial institution. The method may also include the step of calculating the deposit liabilities base by subtracting an estimated attrition of the deposit liabilities base from an estimated increase of the deposit liabilities base based on newly attracted funds.

In an alternative preferred embodiment, a method using a computer system is employed for analyzing the value of a deposit liabilities base associated with a financial institution. In this embodiment, the financial institution seeks to obtain the right to substitute other deposit funds not originally included in the subject deposit liabilities base. Contractual documents are originated through which the financial institution obtains the right to sell the deposit liabilities base to a third party at a predetermined price. First, external market data, and internal data pertaining to the financial institution, is analyzed and input to the computer system. Next, an estimated market value or a range of such values for the deposit liabilities base is calculated, and minimum potential bid price(s) are generated. These bid price(s) are incorporated into the contractual documents, which specify the price or range of prices which will be paid during a predetermined term for the deposit liabilities.

DESCRIPTION OF THE PREFERRED EMBODIMENTS

An explanation of a preferred embodiment of the system and method for implementing a plan to conditionally sell deposit liabilities will now be provided by way of a specific example.

Suppose that in a purchase accounting transaction, Bank A buys Bank B for $20 million. Suppose also that Bank B has book values according to GAAP as follows:

| | |
|---|---|
| Total Assets | $100 million |
| Cash | $3 million |
| Investments | $30 million |
| Loans | $62 million |
| Premises | $1 million |
| Other | $4 million |

| -continued | |
|---|---|
| Total Liabilities | $92 million |
| Checking | $15 million |
| Savings | $25 million |
| NOW | $10 million |
| Money Market | $10 million |
| Cert. of Deposit | $30 million |
| Other | $2 million |
| Total Equity | $8 million |
| Preferred | — |
| Common | $1 million |
| Paid-in | $1 million |
| Retained | $6 million |

I. Inputs

According to the invention, various internal data relating to the subject deposit base to be transacted may be input to the computer system. By way of example, this internal data may include the following internal deposit base characteristics:

A. Internal Data
  1. deposit volume
      a. by category, e.g., demand; NOW; IMMA; savings; time
      b. in the aggregate
  2. weighted average cost
      c. by category, e.g., demand; NOW; IMMA; savings; time
      d. in the aggregate
  3. estimated overhead, or other non-interest, costs attributed to deposit services
      e. Fed Functional Cost Analysis/other data
      f. reserve requirement opportunity costs
      g. other opportunity costs
      h. other
  4. estimated changes in future volume
  i. annual attrition of existing relationships
      i. duration to date
      ii. depositor age
      iii. other
  j. annual retention/expansion/attraction of existing and new relationships
      i. historical experience
B. External factors—also according to the invention, external market data relating to deposit pricing practices, branch divestitures and other pertinent transactions is input to the computer system. By way of example, this external data may include the following:
  1. Local, regional and national peer deposit pricing and historical growth data
  2. comparable market sales data (e.g., numbers of and/or prices paid in spin-offs, divestitures, liquidations)
  3. replacement costs
      a. retail replacement
      b. wholesale funding markets (e.g., Federal Home Loan Bank, Fed funds market, discount window)
  4. industry trends
  5. general economic conditions
  6. current credit rates (e.g., U.S. Treasury, Agency, municipal and corporate debt rates)
  7. rate forecasts

II. Outputs

According to the invention, the computer system analyzes the internal and external data as explained here to generate outputs regarding the subject deposit liabilities base. These outputs are then incorporated in contractual documents that specify the price the writer will pay during a predetermined term for the subject deposit liabilities base (accompanied by a corresponding amount of assets at their own fair market value). By way of example, these outputs may include:

A. Comparison outputs, including:
  1. local, regional, national peer rankings of the subject deposit liabilities base versus similar bases
    a. by pricing within deposit category
    b. by mix
    c. by estimated overhead cost differences
  2. Subject deposit base versus sales comparables
    e. by pricing within deposit category
    f. by mix
    g. by estimated overhead cost differences
  3. Replacement cost comparison
    h. retail replacement
      i. by pricing within deposit category
      ii. by mix
      iii. by estimated overhead cost differences
    i. wholesale replacement
      iv. by pricing
      v. by estimated overhead cost differences
B. Net Present value analysis (see Appendix) steps:
  1. determine annual cost savings versus alternative funding activities
  2. determine discount factor (risk-free rate plus additional risk factor)
  3. adjust annual cost savings for risk and time value of money as follows: annual cost savings/$(1+\text{discount factor})^{yr}$
  4. sum the adjusted annual cost savings
C. Estimated potential market value(s) determined based on II.A.-B.
D. Formulate potential bid(s), based on C., subject to investment criteria, which may include:
  1. probability analysis of put exercise
  2. contract expiration date
  3. fees
  4. regulatory/accounting factors
  5. options market factors It will be understood that multiple iterations may be performed to further refine analysis conclusions.

Of course, it should be understood that various changes and modifications to the preferred embodiments described herein will be apparent to those skilled in the art. Other changes and modifications constituting insubstantial differences from the present invention, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

Assumptions Of Appendix

Core deposit volume=$90 million ($2 million other liabilities excluded from core definition)

Rates/overhead costs constant year to year

Attrition (i.e., "estimated runoff")=10% annually

Expansion/attraction (i.e., "estimated attracted funds")= 12%

Replacement costs: $30 million 1 year wholesale CD funding @ 5.60%

$60 million overnight wholesale funding @ 5.00% weighted average cost=5.20%

Discount factor—premium over risk free rate=3.25% estimated BB rated (on Standard & Poors scale) spread over equivalent duration U.S. treasury yield Estimated useful life of deposit base=12 years

I claim:

1. A method using a computer system for analyzing the value of a deposit liabilities base associated with a financial institution and for providing a deposit liability option contract through which the financial institution obtains an option to sell the deposit liabilities base to a third party at a predetermined price, comprising the steps of:

analyzing external market data, and internal data pertaining to the financial institution, and inputting the external market data and the internal data to the computer system;

calculating an estimated market value or a range of such values for the deposit liabilities base;

generating a minimum potential bid price or a range of such prices for the deposit liabilities base; and incorporating the generated bid price or the range of such prices into the deposit liability option contract, wherein the contractual documents specify the price or range of prices which the third party will pay during a predetermined term for the deposit liabilities;

whereby the value of the deposit liabilities base may be quantified without the requirement of divesting, the deposit liabilities base from the financial institution.

2. The method of claim 1, further comprising the step of the financial institution exercising its right as specified in the contractual documents to sell the deposit liabilities base to the third party.

3. The method of claim 1, wherein the external market data comprises data relating to deposit pricing practices.

4. The method of claim 1, wherein the internal data relates to the deposit liabilities base of the selling financial institution.

5. The method of claim 1, wherein the deposit liabilities base comprises either or both of non-interest bearing and interest bearing deposit accounts.

6. The method of claim 1, wherein the method of analyzing the value of the deposit liabilities base of the financial institution and originating the contractual documents is incorporated into a purchase accounting acquisition of a selling financial institution.

7. The method of claim 1, wherein the method includes the step of calculating the deposit liabilities base by subtracting an estimated attrition of the deposit liabilities base from an estimated increase of the deposit liabilities base based on newly attracted funds.

8. A method using a computer system for analyzing the value of a deposit liabilities base associated with a financial institution seeking to obtain the right to substitute other deposit funds not originally included in the subject deposit liabilities base, while also seeking to purchase the right to sell a deposit liabilities base, and for providing a deposit liability option contract through which the financial institution obtains an option to sell the deposit liabilities base to a third party at a predetermined price, comprising the steps of:

analyzing external market data, and internal data pertaining to the financial institution, and inputting the external market data and the internal data to the computer system;

calculating an estimated market value or a range of such values for the deposit liabilities base;

generating a minimum potential bid price or a range of such prices for the deposit liabilities base; and incorporating the generated bid price or the range of such prices into the deposit liability option contract, wherein the contractual documents specify the price or range of prices which will be paid during a predetermined term for the deposit liabilities;

whereby the value of the deposit liabilities base may be quantified without the requirement of divesting the deposit liabilities base from the financial institution.

* * * * *

UNITED STATES PATENT AND TRADEMARK OFFICE
CERTIFICATE OF CORRECTION

PATENT NO. : 6,363,360 B1
DATED : March 26, 2002
INVENTOR(S) : Mortin P. Madden

It is certified that error appears in the above-identified patent and that said Letters Patent is hereby corrected as shown below:

Column 8,
Line 31, delete the comma in claim 1.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,363,360 B1  
APPLICATION NO. : 09/406214  
DATED : March 26, 2002  
INVENTOR(S) : Martin P. Madden Page 1 of 1

It is certified that error appears in the above-identified patent and that said Letters Patent is hereby corrected as shown below:

Claim 1, Column 8, Line 31:

Error: quantified without the requirement of divesting, the

Correct as follows: quantifed without the requirement of divesting the

Signed and Sealed this

Thirtieth Day of January, 2007

JON W. DUDAS  
*Director of the United States Patent and Trademark Office*